United States Patent [19]

Schlissel

[11] 4,441,734
[45] Apr. 10, 1984

[54] TELESCOPIC SHOPPING CART

[76] Inventor: Ann R. Schlissel, 1745 E. 18th St., Brooklyn, N.Y. 11229

[21] Appl. No.: 323,248

[22] Filed: Nov. 20, 1981

[51] Int. Cl.³ ............................................... B62B 1/12
[52] U.S. Cl. ................................. 280/638; 280/47.26; 280/47.18; 280/652; 220/8; 220/19
[58] Field of Search ................. 280/DIG. 3, DIG. 4, 280/638, 654, 652, 47.26, 651, 659, 79.2, 47.18, 33.99 T, 33.99 S, 33.99 N, 33.99 F, 79.3; 220/8, 19; 5/100; 296/26, 10, 36

[56] References Cited

U.S. PATENT DOCUMENTS

| | | | |
|---|---|---|---|
| 2,711,905 | 6/1955 | Allen | 280/DIG. 3 |
| 2,812,875 | 11/1957 | Buzicky | 220/8 |
| 3,214,187 | 10/1965 | Fuerst | 280/654 |
| 3,236,536 | 2/1966 | Shore | 280/652 |
| 4,004,825 | 1/1977 | Green | 280/654 |

*Primary Examiner*—David M. Mitchell
*Assistant Examiner*—Joseph McCarthy
*Attorney, Agent, or Firm*—Florence U. Reynolds

[57] ABSTRACT

A telescopic 4-sided extension fits inside the frame of the shopping cart and is attached thereto with clips or a spring loaded catch for slidable vertical movement.

3 Claims, 4 Drawing Figures

U.S. Patent  Apr. 10, 1984  4,441,734
FIG.1
FIG.2
FIG.3
FIG.4
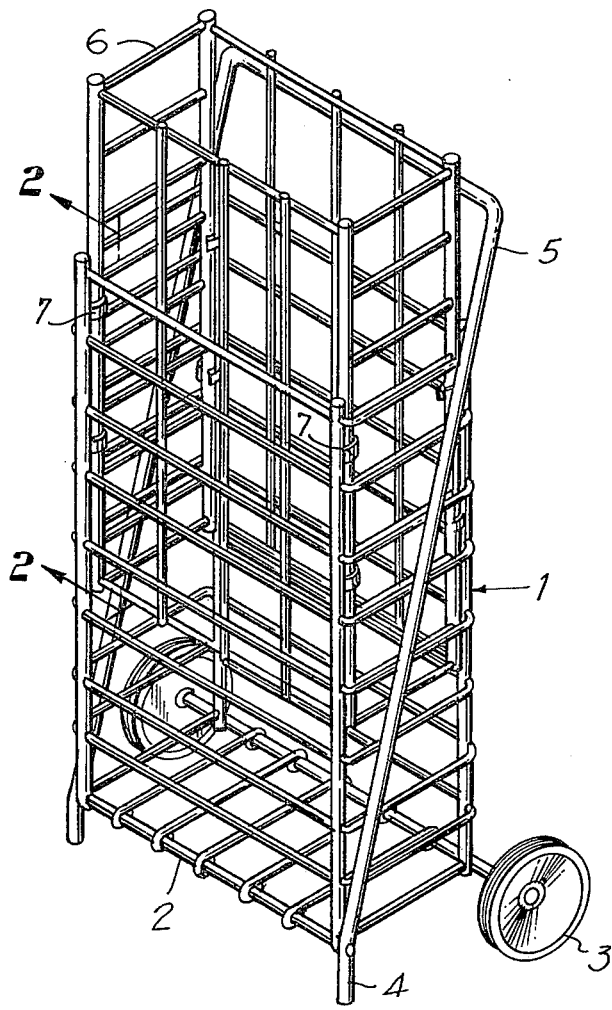
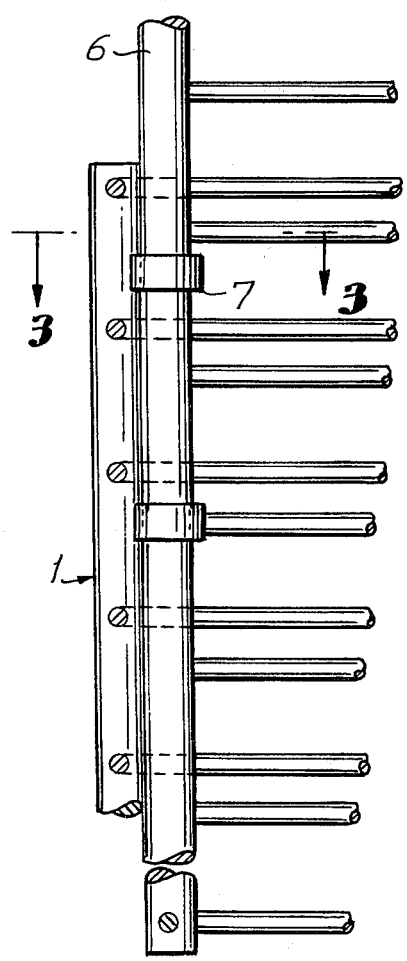
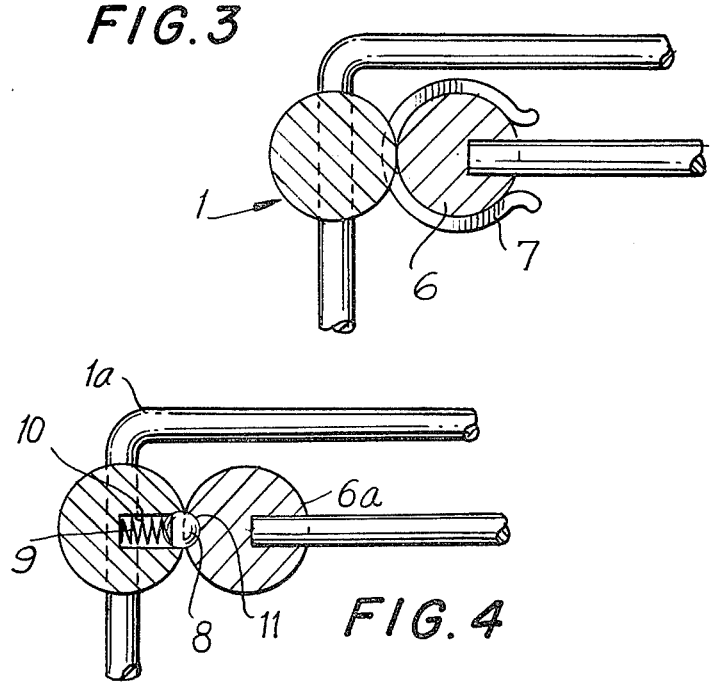

TELESCOPIC SHOPPING CART

BACKGROUND OF THE INVENTION

The invention relates to the field of shopping carts for personal use. Such carts are mounted on wheels, usually only two with two legs for stability. They are commonly made in the form of a metal basket with a handle for guidance and can be folded for storage.

One disadvantage of the ordinary shopping carts is that they are limited in size and are often inadequate for objects or loads that are extra large. However, an oversized cart would be an inconvenience in many instances.

SUMMARY OF THE INVENTION

The object of the invention is to provide a shopping cart which will be adjustable in size to accommodate loads of varying height. This is accomplished by providing a telescopic basket extension which fits within the ordinary shopping cart when not needed but which can be slid upward to extend the height of the cart as desired, even up to double its normal height. The extension may be attached to the cart by clips which hold the basket by tension but which are flexible enough to allow the extension to be pushed up and down. For additional stability in the extended position, the fastening means may be a spring loaded catch consisting of a spring loaded bead in a bore on either the cart frame or the extension frame and a corresponding recess in the extension frame or cart frame, respectively, into which the bead fits, thus locking the extension on the cart at a selected height.

BRIEF DESCRIPTION OF THE DRAWINGS

FIG. 1 is a perspective view of a shopping cart with a telescopic extension according to the invention.

FIG. 2 is a sectional view taken along line 2—2 of FIG. 1, showing clips holding the extension to the cart frame.

FIG. 3 is a detail in section of the clip taken along line 3—3 of FIG. 2.

FIG. 4 is a detail in section of a spring loaded catch for locking the position of the extension on the cart.

DETAILED DESCRIPTION

FIG. 1 shows the cart frame 1 having a foldable bottom section 2, two wheels 3, and front legs 4. A handle 5 is integral with the front legs 4. The telescopic extension 6 is attached to the cart frame 1 by means of clips 7.

FIG. 4 shows a spring loaded catch for locking the telescopic extension in a certain position. The catch comprises a ball detent 8 held in extended position by spring 9 in a bore 10 of the cart frame 1a and locking into a recess 11 in the extension frame 6a.

It is understood that other variations of the design and material of the cart and its extension may be made without departing from the scope of the invention as defined in the appended claims. For example, the sides of the cart may be made of sheets of rigid material and the cart may have four wheels.

I claim:

1. In a wheeled shopping cart comprising a container member having a frame defining four sides and a bottom, the improvement which comprises an extension member defining four walls and fitting telescopically within said container member and extendible vertically upward in order to variably increase the volume of the container member of the cart; and fastening means engaging the frame of said container member and the extension member in order to hold the extension member in any desired extended position.

2. The cart according to claim 1, wherein the fastening means comprises a plurality of flexible clips permitting sliding movement of said extension member.

3. The cart according to claim 1, wherein the fastening means comprises a plurality of spring-loaded catch positions.

* * * * *